United States Patent
Konya et al.

(10) Patent No.: US 7,925,235 B2
(45) Date of Patent: Apr. 12, 2011

(54) COMMUNICATION SYSTEM

(75) Inventors: Satoshi Konya, Kanagawa (JP);
Takanori Washiro, Kanagawa (JP)

(73) Assignee: Sony Corporation, Tokyo (JP)

( * ) Notice: Subject to any disclaimer, the term of this patent is extended or adjusted under 35 U.S.C. 154(b) by 756 days.

(21) Appl. No.: 11/873,579

(22) Filed: Oct. 17, 2007

(65) Prior Publication Data

US 2008/0125036 A1     May 29, 2008

(30) Foreign Application Priority Data

Oct. 19, 2006  (JP) ................................. 2006-284870

(51) Int. Cl.
*H04B 1/18* (2006.01)
*H04B 5/00* (2006.01)
*H04B 11/00* (2006.01)

(52) U.S. Cl. ........................ 455/282; 455/41.1; 333/150

(58) Field of Classification Search ............... 455/562.1, 455/575.7, 97, 274, 279.1, 14, 523, 270, 455/282, 41.1, 41.2; 333/240, 150
See application file for complete search history.

(56) References Cited

U.S. PATENT DOCUMENTS

| 2,685,068 | A | 7/1954 | Goubau | |
|---|---|---|---|---|
| 2,921,277 | A | 1/1960 | Goubau | |
| 5,555,337 | A | 9/1996 | Hata | |
| 6,987,490 | B2 * | 1/2006 | Sano | 343/788 |
| 2006/0164300 | A1 * | 7/2006 | Ellard | 342/374 |

FOREIGN PATENT DOCUMENTS

| JP | 07-175987 | 7/1992 |
|---|---|---|
| JP | 2003-115707 | 4/2003 |
| JP | 2004-214879 | 7/2004 |
| JP | 2005-18671 | 1/2005 |
| JP | 2006-60283 | 3/2006 |
| JP | 2006-106612 | 4/2006 |

* cited by examiner

*Primary Examiner* — Eugene Yun
(74) *Attorney, Agent, or Firm* — Finnegan, Henderson, Farabow, Garrett & Dunner, L.L.P.

(57) ABSTRACT

A communication system includes: a transmitter including a transmission circuit unit generating an RF signal for transmitting data and an electrical-field coupling antenna transmitting the RF signal as an electrostatic field or an induction field; a receiver including an electrical-field coupling antenna and a reception circuit unit subjecting an RF signal received by the electrical-field coupling antenna to reception processing; and a surface-wave propagation device including a plurality of linear surface-wave transmission lines for propagating a surface wave radiated from the electrical-field coupling antenna of the transmitter.

5 Claims, 16 Drawing Sheets

COMMUNICATION SYSTEM

CROSS REFERENCES TO RELATED APPLICATIONS

The present invention contains subject matter related to Japanese Patent Application JP 2006-284870 filed in the Japanese Patent Office on Oct. 19, 2006, the entire contents of which are incorporated herein by reference.

BACKGROUND OF THE INVENTION

1. Field of the Invention

The present invention relates to a communication system that performs bulk data communication between information apparatuses, and more particularly to a communication system that performs data communication without interference with other communication systems between information apparatuses using electrostatic magnetic field.

More specifically, the present invention relates to a communication system that realizes bulk transmission by electric field coupling using radio-frequency (hereinafter referred to as RF) signals, and more particularly to a communication system that extends a distance between electrodes of a transmitter and a receiver to be electrostatic coupled and makes an arrangement between the transmitter and the receiver and designs of communication apparatuses flexible.

2. Description of the Related Art

Recently, when data is transferred between small-sized information apparatuses, for example, when data of images, music, and the like are exchanged between personal computers, a radio interface is often used instead of a method of transferring data via data communication performed by mutually connecting the apparatuses with a general-purpose cable such as an AV (Audio Visual) cable or a USB (Universal Serial Bus) cable or via a medium such as a memory card. When the radio interface is used, it is unnecessary to reattach a connector and draw around a cable every time data transfer is performed, and thus it is very convenient for the user. Many information apparatuses implemented with various cableless communication functions are also placed on the market.

As a method of performing data transfer between small-sized apparatuses without using a cable, radio wave communication schemes for transmitting and receiving radio signals using antennas such as wireless LAN (Local Area Network) communication and Bluetooth (a registered trademark) communication represented by IEEE802.11 are developed. However, since a transmitter emits a radio wave regardless of whether there is a communication partner, there is a problem in that the transmitter is likely to be a generation source of a radio wave interfering with a communication system near the transmitter. Also, since an antenna of a receiver receives radio waves arriving from a distance, the receiver is susceptible to an interference radio wave around the receiver. The interference radio wave causes the deterioration in reception sensitivity. When there are plural communication partners, it is necessary to perform complicated setting in order to select a desired communication partner out of the plural communication partners. When plural pairs of radios perform radio communication in a narrow range, each of the pairs needs to perform frequency selection to communicate with each other in order to prevent interference among the pairs. Also, the transmitter and the receiver may be unable to communicate with each other when directions of polarization of radio waves are orthogonal.

On the other hand, as the radio communication, other than the radio wave communication performed in which the radiation-electric field is used, there are communication schemes using an induction field, an electrostatic filed, and the like. For example, in a communication system using an electrostatic field, a coupling relation is not formed when no communication partner is present nearby. That is to say, a radio wave is not radiated, and thus the communication system does not interfere with other communication systems. Also, even if a radio wave arrives from a distance, since an electrical-field coupling antenna (coupler) (hereinafter referred to as an EFC antenna) does not receive the radio wave, the communication system is prevented from being interfered by other communication systems.

Data communication techniques using an induction field or an electrostatic field have been used widely for an RFID, etc. For example, an RFID tag system has been proposed in which a set of a plurality of communication supporting bodies arranged to place RFID tags among the communication supporting bodies are formed and the RFID tags attached to a plurality of commodities are arranged to be placed among the communication supporting bodies, whereby even in a state in which the RFID tags overlap each other, it is possible to stably read and write information (see, for example, JP-A-2006-60283).

Also, a data communication apparatus has been proposed which includes an apparatus main body and wearing means for wearing this apparatus main body, includes an antenna coil and data communication means for performing data communication in a non-contact manner with an external communication apparatus via this antenna coil, has the antenna coil and the data communication means arranged in an outer case provided in an upper part of the apparatus main body, and uses an induction magnetic field (see, for example JP-2004-214879).

Also, a cellular phone has been proposed in which an antenna coil for performing data communication with an external apparatus is mounted on a memory card inserted in a portable information apparatus and an antenna coil for RFID is arranged on the outer side of a memory card slot of the portable information apparatus to secure a communication distance without spoiling portability in the RFID (see, for example, JP-A-2005-18671).

The RFID system of the past that uses an electrostatic field and an induction field has a low communication speed, because a low-frequency signal is used, and thus is unsuitable for bulk data transmission. To cope with this problem, the inventors consider that it is possible to perform bulk transmission by transmitting an RF signal using electric field coupling.

However, whereas the field intensity of a radiation electric field gently attenuates in inverse proportion to a distance, the field intensity of the induction field and the field intensity of the electrostatic field steeply attenuate in inverse proportion to the square and the cube of the distance, respectively, that is to say, the attenuation of a signal due to a communication distance is large. Also, since a propagation loss occurs according to the length of a propagation distance with respect to a wavelength, when an RF signal is propagated by electric field coupling, a problem of a propagation loss corresponding to an inter-electrode distance becomes conspicuous. It is therefore necessary to bring the electrodes (EFC antennas) of a transmitter and a receiver into close contact with each other as much as possible. Accordingly, it is difficult for the transmitter and the receiver to communicate with each other in a long distance, and thus it is not convenient for the user.

Also, in order to bring the electrodes for performing electrostatic coupling into close contact with each other, it is necessary to make a subtle adjustment on the positions of the electrodes, and the positions needs to be maintained during data communication.

Also, when an electrode for electrostatic coupling is housed in the case of a communication apparatus, it is necessary to dispose the electrode at the outside of the case as much as possible in order to reduce the distance between the electrodes at the time of data communication. Thus, the restriction is imposed on the degree of freedom of the layout in the design of the case.

SUMMARY OF THE INVENTION

It is desirable to provide an excellent communication system that can perform data communication without interference with other communication systems using an electrostatic field between information apparatuses.

It is also desirable to provide an excellent communication system that can realize bulk data transmission by electrostatic coupling using RF signals.

According to an embodiment of the present invention, there is provided a communication system including: a transmitter including a transmission circuit unit generating an RF signal for transmitting data and an EFC antenna transmitting the RF signal as an electrostatic field or an induction field; a receiver including an EFC antenna and a reception circuit unit that subjects an RF signal received by the EFC antenna to reception processing; and a surface-wave propagation device including a plurality of linear surface-wave transmission lines that propagate a surface wave radiated from the EFC antenna of the transmitter.

The "system" in this context means a logical collection of a plurality of apparatuses (or functional modules that realize specific functions) and it does not matter whether the individual apparatuses or the individual functional modules are housed in a single case (the same thing applies in the following).

In the case of radio communication systems using an antenna, represented b a wireless LAN, it is difficult to realize bulk transmission by RF broadband signals and weak radio communication in a very short distance. Also, there is a problem in interference with other communication systems. In contrast, in a communication system using an electrostatic magnetic field, there is no coupling relation when a communication partner is not present nearby. That is to say, a radio wave is not radiated, and thus the communication system does not interfere with other communication systems. Also, even if a radio wave arrives from a distance, an EFC antenna does not receive the radio wave. Thus, the communication system is not interfered by the other communication systems. In a known communication system using electrostatic coupling, a low-frequency signal is used, and thus the communication system is unsuitable for bulk data transmission. However, the inventors consider that it is possible to perform the bulk data transmission using an RF signal by electrostatic coupling.

Here, the field intensity of the electrostatic magnetic field attenuates in inverse proportion to the cube of a distance. Further, in the case of using the RF signal, since the RF signal has a short wavelength, a propagation loss is large. Thus, by the surface-wave propagation device transmitting a surface wave radiated from the EFC electrode of the transmitter, it is possible to perform data transfer without bringing the electrodes of the transmitter and the receiver sufficiently close to each other and performing fine positioning.

The surface-wave propagation device includes, for example linear surface-wave transmission lines made of a metal whose surface is insulated.

In order for the surface-wave propagation device to capture the electrostatic magnetic field occurred from the EFC electrode of the communication device to be a transmitter as a surface wave, it is necessary for the user to carry out difficult work, such as positioning the EFC electrode at a certain part of the apparatus, and adjusting the angle facing to the apparatus to obtain the optimum communication state. Accordingly, even if the communication device having the same configuration is used, the maximum communication speed might not be obtained depending on the disposition of the EFC electrode.

Thus, the inventors propose a surface-wave propagation device which includes, for example, a plurality of wire rods made of metal whose surface is insulated and propagates a surface wave using the plurality of wire rods. The surface-wave propagation device has a bundle end formed by bundling the plurality of wire rods at one end, the bundle of the wire rods are undone at the other end of the surface-wave transmission lines, and an end face of each of the wire rods is distributedly disposed on a flat coupling face.

The surface-wave propagation device is attached to, for example one of a pair of communication devices performing data transmission using electrostatic coupling. The EFC electrode of the communication device is placed substantially perpendicularly to the end face of the bundle end of the bundle of wire rods with a few millimeters apart to obtain electrostatic coupling.

At the same time, the bundle of a plurality of wire rods are undone at the other end of the surface-wave transmission line, and the end face of each wire rod is disposed distributedly on a flat coupling face. Accordingly, when the user brings the coupling face of the communication device to be the communication partner close to any part of the coupling face in a distance of about a few millimeters or a few centimeters, an electrostatic coupling effect arises between the EFC electrodes of both communication devices through a part of wire rods whose end face is opposed to the coupling electrode. Thus, it becomes possible to perform data communication by surface-wave transmission.

For example, the shape of a sheet can be applied to the flat coupling face. Even if an EFC-electrode embedded device is placed on any part of the sheet, it is possible to obtain a state allowing data transfer, and thus the degree of freedom in the positioning of the EFC electrode to be placed close to the sheet increases. That is to say, it becomes easy for the user to carry out the work for obtaining the optimum communication state.

There are various ways for distributing end faces of individual wire rods constituting a surface-wave transmission line on a flat coupling face. The various ways can flexibly correspond to the implementation and the design of the product. Also, the end face of each wire rod can be disposed such that a user interface, such as a specific logo or an icon is drawn.

Also, in a surface-wave transmission line made of a plurality of wire rods, a specific relationship or rule may be established between an arrangement of end faces of individual wire rods at the bundle end formed by bundling a plurality of the wire rods and an arrangement of end faces of individual wire rods distributed on the flat coupling face.

For example, on an end face of the bundle end bundling wire rods, a first wire-rod group is formed to be disposed substantially in the center, and a second wire-rod group is formed to surround the first wire-rod group in the periphery. On the other hand, on the flat coupling face, the first wire-rod group and the second wire-rod group are disposed to have substantially uniform densities at each part.

At the end face of the bundle end bundling the wire rods, a RF is efficiently captured mainly by the first wire-rod group and the opposed EFC electrode thereto. Even if the positional relationship between the bundle end and the EFC electrode is shifted, it is easy to maintain a good positional relationship between the end face of the first wire-rod group, which is substantially at the center of the bundle end and the EFC electrode. At the same time, on the flat coupling face, the first wire-rod group is disposed substantially uniformly distributedly to have uniform densities at any part. Thus, even if the EFC electrode of the communication device to be a communication partner is brought close to any place, it is possible to ensure uniform communication quality without depending on the place by receiving the electrostatic magnetic field propagated through the wire rods included in the first wire-rod group.

In the basic form of the surface-wave propagation device made of a plurality of wire rods, a bundle end is formed by bundling a plurality of wire rods at one end, whereas the bundle of the wire rods are undone at the other end of the linear surface-wave transmission lines, and an end face of each of the wire rods is distributedly disposed on the flat coupling face. As a modification, a bundle end is formed by bundling a plurality of wire rods, and at the same time, the bundle of these wire rods may be undone, may be divided into two, and the end faces of the wire rods may be disposed distributedly on the coupling face. In such a case, the user brings the EFC electrode of the communication device close to either of the coupling faces, and thus it becomes possible to perform data communication with the communication device whose EFC electrode is disposed on the bundle end.

Also, as a modification, a plurality of bundle ends, each of which is bundling a plurality of wire rods, may be provided, and the bundle of the wire rods of each bundle end may be undone, and end faces of these wire rods may be disposed uniformly distributedly on one flat coupling face. In such a case, the user brings the EFC electrode of the communication device close to the flat coupling face, and thus it becomes possible to perform data communication with the communication device whose EFC electrode is disposed on either of the bundle ends.

By the present invention, it is possible to provide an excellent communication system capable of performing data communication without interference with other communication systems using an electrostatic field between information apparatuses.

Also, by the present invention, it is possible to provide an excellent communication system capable of realizing bulk data transmission of an RF signal by electrostatic coupling.

In the communication system according to an embodiment of the present invention, the surface-wave propagation means efficiently transmits a surface wave radiated from the EFC electrode of the transmitter with a low propagation loss. Thus, it is possible to perform data transmission even in a long distance by electrostatic coupling.

In the communication system according to an embodiment of the present invention, it is possible to lead a surface wave radiated from the EFC electrode to a position for easy use by a surface-wave transmission line. Also, it becomes unnecessary to perform fine positioning between the electrodes in order to bring the electrodes to be electro-statically coupled sufficiently close together.

Other objects, characteristics, and advantages of the present invention will be made apparent by more detailed explanation based on embodiments of the present invention described later and the accompanying drawings.

DESCRIPTION OF THE PREFERRED EMBODIMENTS

Figure 1:
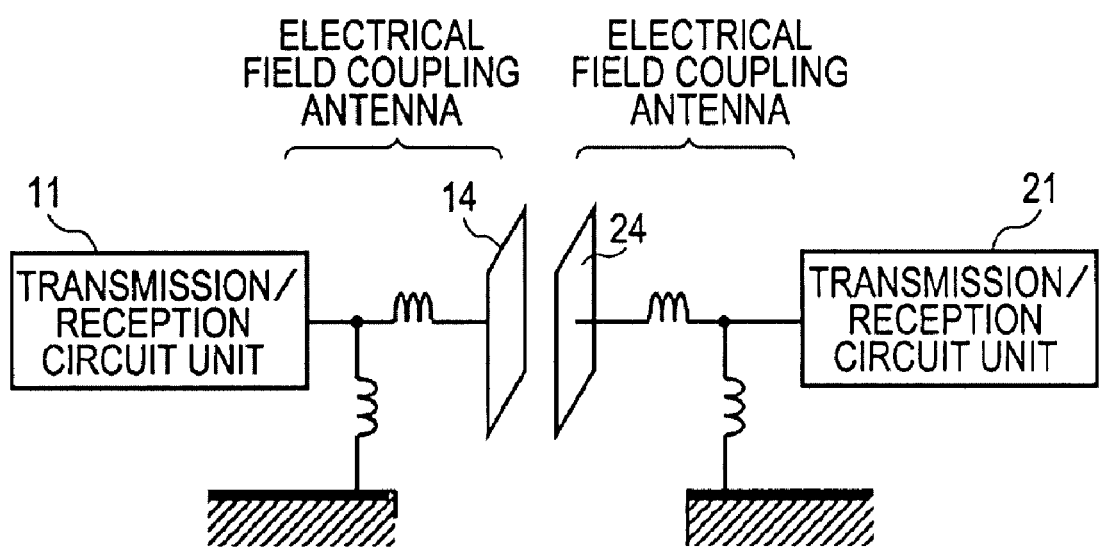
FIG. 1 is a diagram illustrating a basic configuration of a communication system using electrostatic coupling.

In the following, a detailed description will be given of an embodiment of the present invention with reference to the drawings.

The present invention relates to a communication system that performs data transmission between information apparatuses using an electrostatic magnetic field. By a communication method based on electrostatic coupling, there is no coupling relation and a radio wave is not radiated when a communication partner is not present nearby. Thus, the communication system does not interfere with other communication systems. Even if a radio wave arrives from a distance, since an EFC antenna does not receive the radio wave, the communication system is not interfered by the other communication systems.

Also, in a radio communication using an antenna, the field intensity of a radiation electric field is inversely proportional to a distance. In contrast, the field intensity attenuates in inverse proportion to the square of a distance in the induction field, and the field intensity attenuates in inverse proportion to the cube of a distance in the electrostatic magnetic field. Thus, by the communication method based on electrostatic coupling, it is possible to form an extremely low-power radio, which is about a noise level, for the other radio systems in the vicinity. Accordingly, it becomes unnecessary to obtain a license for a radio station.

Also, in a known communication by electrostatic coupling, bulk data transmission is unsuitable, because a low-frequency signal is used. However, by transmitting a RF signal by electrostatic coupling, it is thought that bulk data transmission is possible. Specifically, by applying a communication system using an RF and a wideband, such as UWB (Ultra Wide Band) communication to electrostatic coupling, it is possible to realize very weak radio and bulk data communication.

With the UWB communication, it is possible to realize bulk radio transmission at about 100 Mbps in a short distance using a very wide frequency band of 3.1 GHz to 10.6 GHz (For example, it is possible to transfer bulk data, such as moving images and music data for one CD at a high speed and in a short time). The development of a transmission system using a UWB low band of 3.1 GHz to 4.9 GHz is actively carried out in consideration of the fact that data transmission at a speed exceeding 100 Mbps is possible without occupying a transmission bend of 3.1 GHz to 10.6 GHz and the easiness of producing an RF circuit.

The UWB communication is a communication technique originally developed as a radio wave communication using an antenna. In the present invention, the UWB communication realizes high-speed data transmission in a short distance by a very weak electric field. By the UWB communication using electrostatic coupling, it is possible to realize high-speed data transmission in a short distance by a very weak electric field. It is thought that the UWB communication using electrostatic coupling becomes one of effective radio communication techniques implemented in mobile apparatuses, for example an ultra-high speed DAN (Device Area Network) for a short distance including a storage device.

When the UWB communication is performed by electrostatic coupling rather than radio wave communication, the field intensity of the electrostatic coupling is inversely proportional to the cube of a distance. Thus, it is possible to form very weak radio, which requires no license to a radio station by controlling the field intensity (the intensity of a radio wave) in a distance of 3 meters from radio equipment to be equal or lower than a predetermined level. Accordingly, it is possible to constitute a communication system at a low cost. Also, when data communication is performed in a very short distance by the electrostatic coupling method, there are advantages in that a signal quality is not deteriorated by a reflective object present in the surrounding, and it is not necessary to consider the prevention of hacking and the ensuring of confidentiality of the transmission line.

FIG. 1 illustrates a basic configuration of a communication system using electrostatic coupling. The communication system shown in the fig includes a pair of communication devices 10 and 20.

EFC electrodes 14 and 24 held by the communication devices 10 and 20, respectively are arranged to be opposed to each other at a distance apart, for example about 3 cm, and can be electro-statically coupled. When a transmission request is sent from an upper application, a transmission/reception circuit unit 11 of the communication device 10 generates an RF transmission signal, such as a UWB signal on the basis of transmission data. The signal is propagated between the EFC electrode 14 and the EFC electrode 24 of the other communication device 20 by electrostatic coupling. A transmission/reception circuit unit 21 of the communication device 20 performs demodulation and decoding processing, and passes reproduced data to the upper application.

Figure 2:
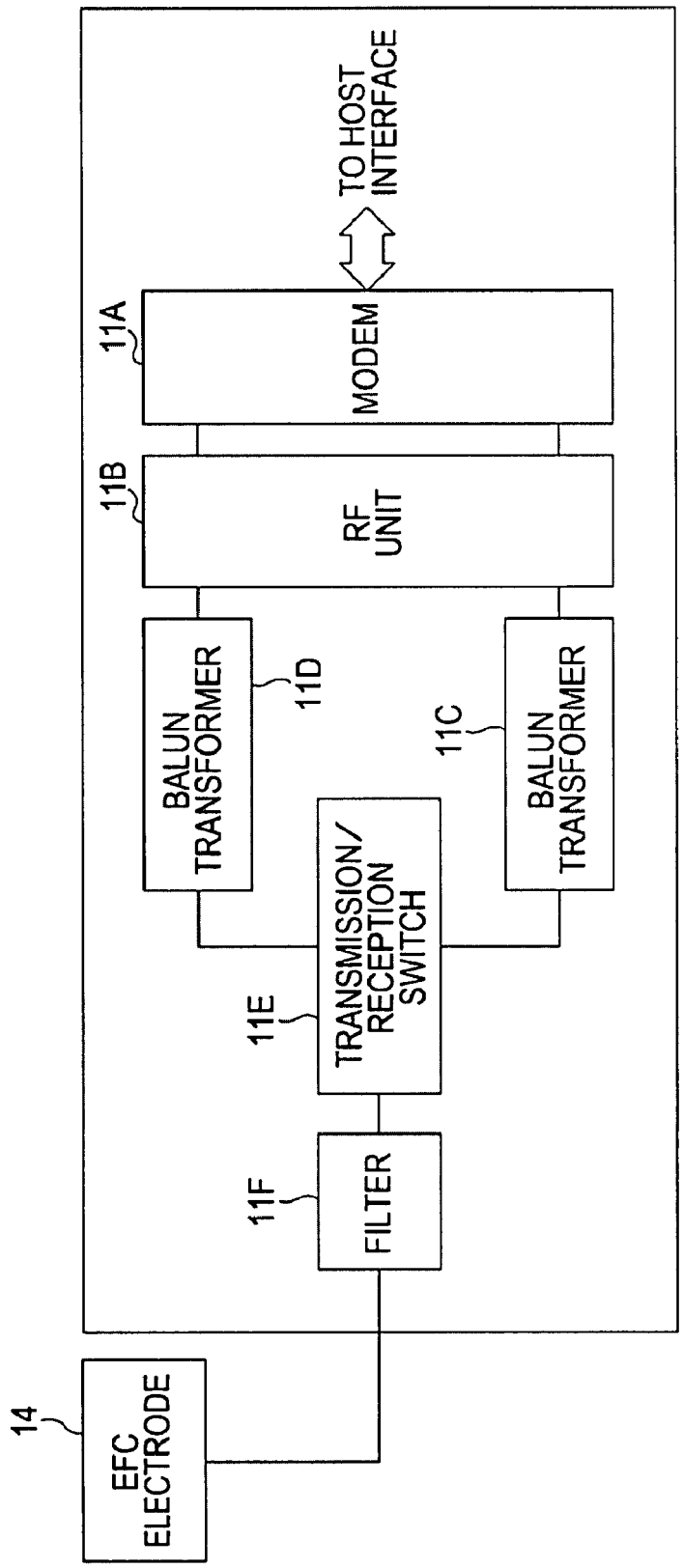
FIG. 2 is a diagram illustrating an internal configuration of a transmission/reception circuit unit 11 in a communication apparatus 10.

FIG. 2 illustrates an internal configuration of the transmission/reception circuit unit 11 in the communication apparatus 10. It should be understood that the transmission/reception circuit unit 21 in the communication apparatus 20 has the same configuration.

At the time of data transmission, transmission data is modulated by a modem 11A, the transmission signal is upconverted by an RF unit 11B into a radio frequency band, the band is restricted by a filter 11F after passing through a balun transformer 11C and a transmission/reception switch 11E, and a electrostatic magnetic field is emitted by the EFC electrode 14. Also, at the time of data reception, the signal received by the EFC electrode 14 is subjected the band restriction through the filter 11F, the signal is passed through the transmission/reception switch 11E and a balun transformer 11D, the signal is downconverted by the RF unit 11B, and then demodulated by the modem 11A.

By a communication method using an RF and a wideband, such as the UWB communication, it is possible to realize ultra-high speed data transmission at about 100 Mbps in a short distance. Also, when the UWB communication is performed by electrostatic coupling rather than the radio communication, the field intensity is inversely proportional to the cube of a distance. Thus, it is possible to form extremely weak radio, for which a license to a radio station is unnecessary, by controlling the field intensity (the intensity of a radio wave) in a distance of 3 meters from radio equipment to be not higher than a predetermined level. Accordingly, it is possible to constitute a communication system at a low cost. Also, when data communication is performed in a very short distance by electrostatic coupling, there are advantages in that a signal quality is not deteriorated by a reflective object present in the surrounding, and it is not necessary to consider the prevention of hacking and the ensuring of confidentiality of the transmission line.

Here, the communication method using electrostatic coupling has a problem in that the attenuation with respect to a distance is high. Also, a propagation loss occurs in accordance with the length of a propagation distance with respect to a wavelength, and thus when an RF signal is propagated by electrostatic coupling, a problem of a propagation loss due to the distance between the electrodes becomes conspicuous. It is therefore necessary to bring the EFC electrodes (the EFC antennas) of a transmitter and a receiver into close contact with each other as much as possible. Also, it is difficult to perform communication in a long distance, which is inconvenient for the user.

Also, in order to produce electrostatic coupling between the electrodes, it is necessary to fine adjust the positioning of the electrodes and to maintain the positioning during data communication. The user needs to know difficulties, for example, at which the part of the device the electrode is disposed, which part of the apparatus is to be contacted, and at what angle the electrodes are to be faced with each other to obtain the optimum communication state. Accordingly, there are many difficulties for the user, and thus the maximum communication speed might not be obtained.

Incidentally, in radio communication, a radio wave radiated from an antenna is a "transversal wave" oscillating in a direction orthogonal to a traveling direction of the radio wave. The radio wave is not possible to perform communication when a direction of polarization is orthogonal thereto. In contrast, in the method of communication by electrostatic coupling, it is known that a electromagnetic wave radiated from the EFC electrode includes a "longitudinal wave" oscillating in the traveling direction other than the transversal wave. The longitudinal wave is also referred to as a "surface wave", and propagates through, for example inside and the surface of a medium such as a dielectric, a magnetic body, etc., and further the surface of a metal.

Figure 3:
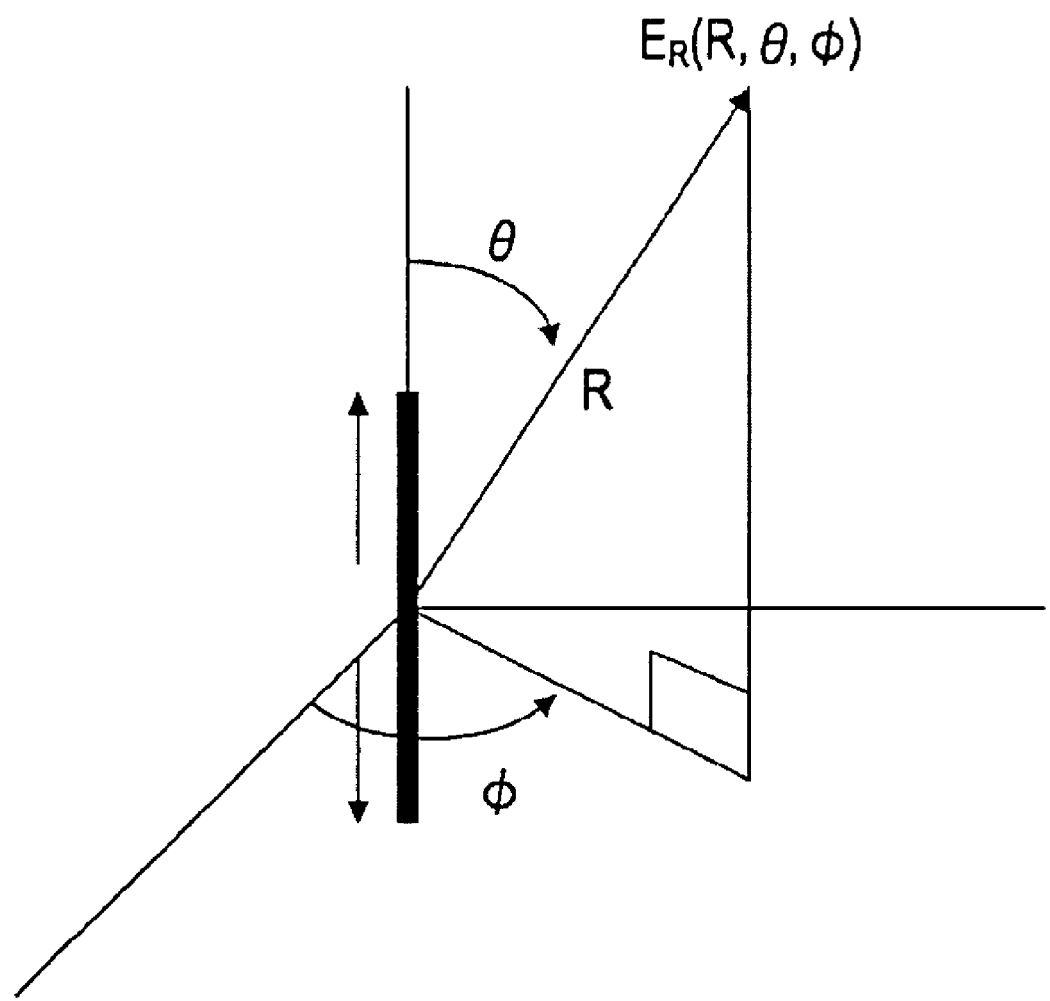
FIG. 3 is a diagram illustrating an electric component (a longitudinal component) $E_R$ oscillating in a direction parallel to a propagation direction.

An electric field component (a longitudinal component) $E_R$ oscillating in a direction parallel to the propagation direction is expressed as the following expression (see FIG. 3). As is understood from the expression, the longitudinal component includes only a component inversely proportional to the square of the distance (the induction field) and a component inversely proportional to the cube of the distance (the electrostatic field), and does not include the component of the radiation magnetic field. Also, the electric field $E_R$ has a maximum value in a direction in which $|\cos \theta|=1$, i.e., an arrow direction in FIG. 2. The following expression represents the electromagnetic field generated by the infinitesimal dipole antenna. However, since an arbitrary current distribution is regarded as a continuous collection of such infinitesimal dipole antennas, an electromagnetic field induced by the current distribution has the same characteristic (see, for example, Yasuhito Mushiake "Antenna/Radio Wave Propagation" (Corona Publishing Co., Ltd., pp 16 to 18).

$$E_R = \frac{pe^{-jkR}}{2\pi\varepsilon}\left(\frac{1}{R^3} + \frac{jk}{R^2}\right)\cos\theta \quad \text{[Expression 1]}$$

In a radio communication system according to an embodiment of the present invention, it is possible to dispose a surface-wave transmission line made of a metal whose surface is insulated, a dielectric, a magnetic body, etc., between the EFC electrode of the transmitter and the EFC electrode of the receiver, and efficiently propagate a surface wave among electromagnetic waves radiated from the EFC electrode of the transmitter through the inside or the surface of the surface-wave transmission line. That is to say, it becomes possible to perform more efficient signal transmission compared with the signal propagation in the atmosphere. Accordingly, even if the EFC electrodes of the transmitter and the receiver are spaced apart a relatively long distance, it is possible to transmit a surface wave radiated by electrostatic coupling with a small propagation loss, and thus to perform data transmission without bringing the electrodes into close contact. Thus, it becomes more convenient for the user.

In this regard, concerning the details of a mechanism of the surface-wave transmission line for propagating an electromagnetic wave, see for example Masamitsu Nakajima "Micro Wave Engineering (Morikita Publishing Co., Ltd., pp 182 to 190)".

Figure 4:
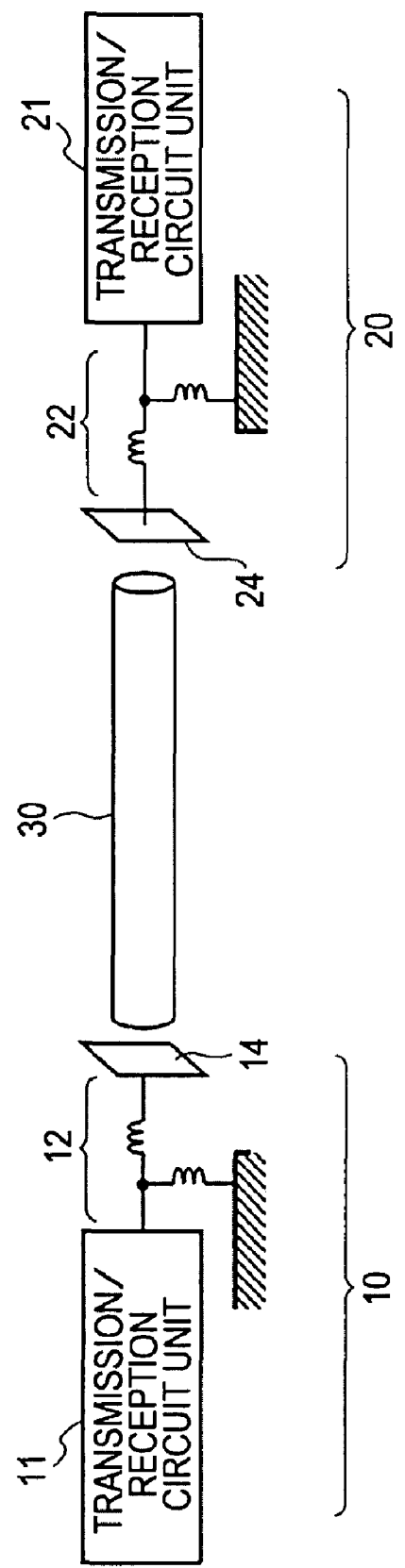
FIG. 4 is a diagram illustrating an example of a configuration of a communication system using a surface-wave transmission line made of a metal whose surface is insulated.

FIG. 4 illustrates an example of a configuration of a communication system using a surface-wave transmission line made of a metal whose surface is insulated. The communication system in the figure includes a pair of communication devices 10 and 20, and a surface-wave transmission line 30 through which a surface wave radiated from an EFC electrode 14 or an EFC electrode 24 is transmitted with a small propagation loss. The surface-wave transmission line 30 is made of a metal whose surface is insulated, and is disposed along a traveling direction of the surface wave radiated from the EFC electrodes 14 and 24.

When a transmission request is sent from an upper application, a transmission/reception circuit unit 11 of the communication device 10 generates an RF transmission signal, such as a UWB signal on the basis of transmission data. The signal output from the transmission/reception circuit unit 11 resonates in a resonating section 12, and is radiated from the EFC electrode 14 in a front direction as a surface wave.

The surface wave radiated from the EFC electrode 14 propagates through the surface-wave transmission line 30 without a loss, and is input from a reception electrode 24 of the communication device 20 to a transmission/reception circuit unit 21 through a resonating section 22. The transmission/reception circuit unit 21 performs demodulation and decoding on the received RF signal, and passes the reproduced data to the upper application.

By the interposition of the surface-wave transmission line 30, the signal efficiently propagates from one of the EFC electrodes 14 to the other of the EFC electrodes 24. At this time, in order to reduce the ratio wave radiated to the outside as a transmitted wave, it is desirable to make the incident angle of the surface wave radiated from the EFC electrode 14 large, and to dispose the end face of the surface-wave transmission line 30, made of a metal whose surface is insulated, at the front of the EFC electrode 14 so as to be perpendicular to the radiation face of the electrode 14. Also, at the EFC electrode 24, in order to receive the electromagnetic field radiated from the other end face of the surface-wave transmission line 30 with a small ratio of leakage to the outside, it is necessary to dispose the reception face of the electrode 24 so as to be perpendicular to the end face of the surface-wave transmission line 30.

However, in order for the surface-wave transmission line 30 to capture the electrostatic magnetic field occurred from the EFC electrode as a surface wave, the user needs to know difficulties, for example, at which the part of the device the electrode is disposed, which part of the apparatus is to be contacted, and at what angle the electrodes are to be faced with each other to obtain the optimum communication state. Thus, the maximum communication speed might not be obtained.

Figure 5:
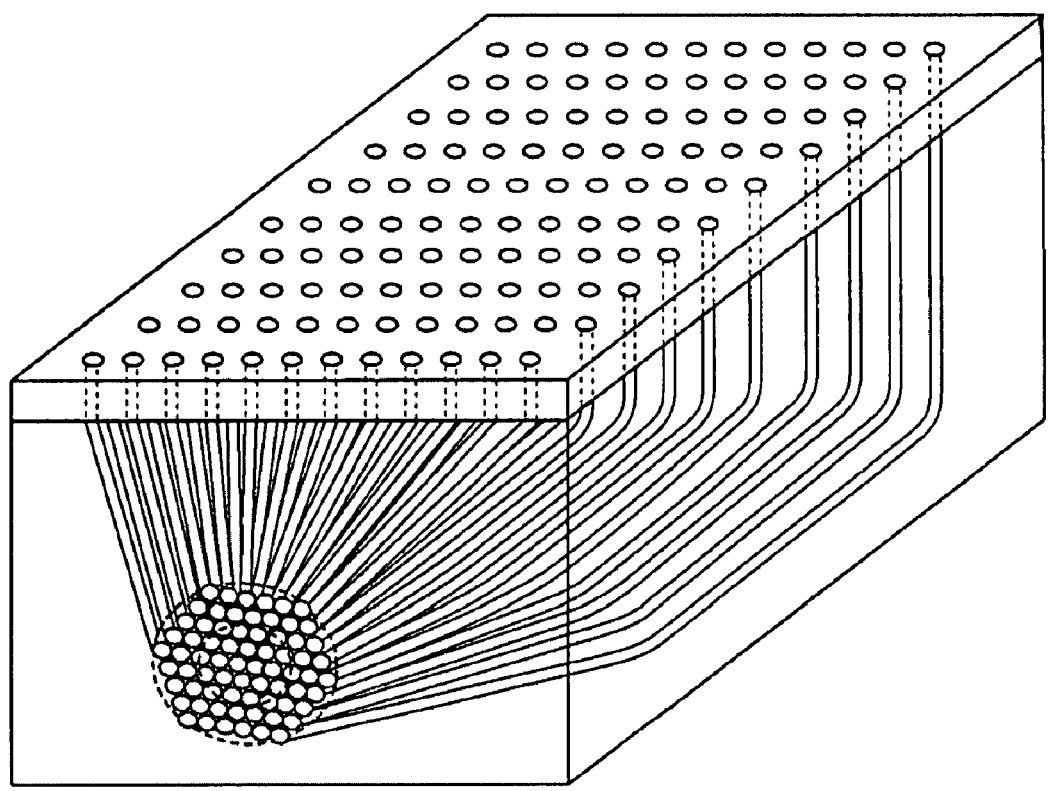
FIG. 5 is a diagram illustrating a configuration of a surface-wave transmission line proposed in the present invention.
Figure 6:
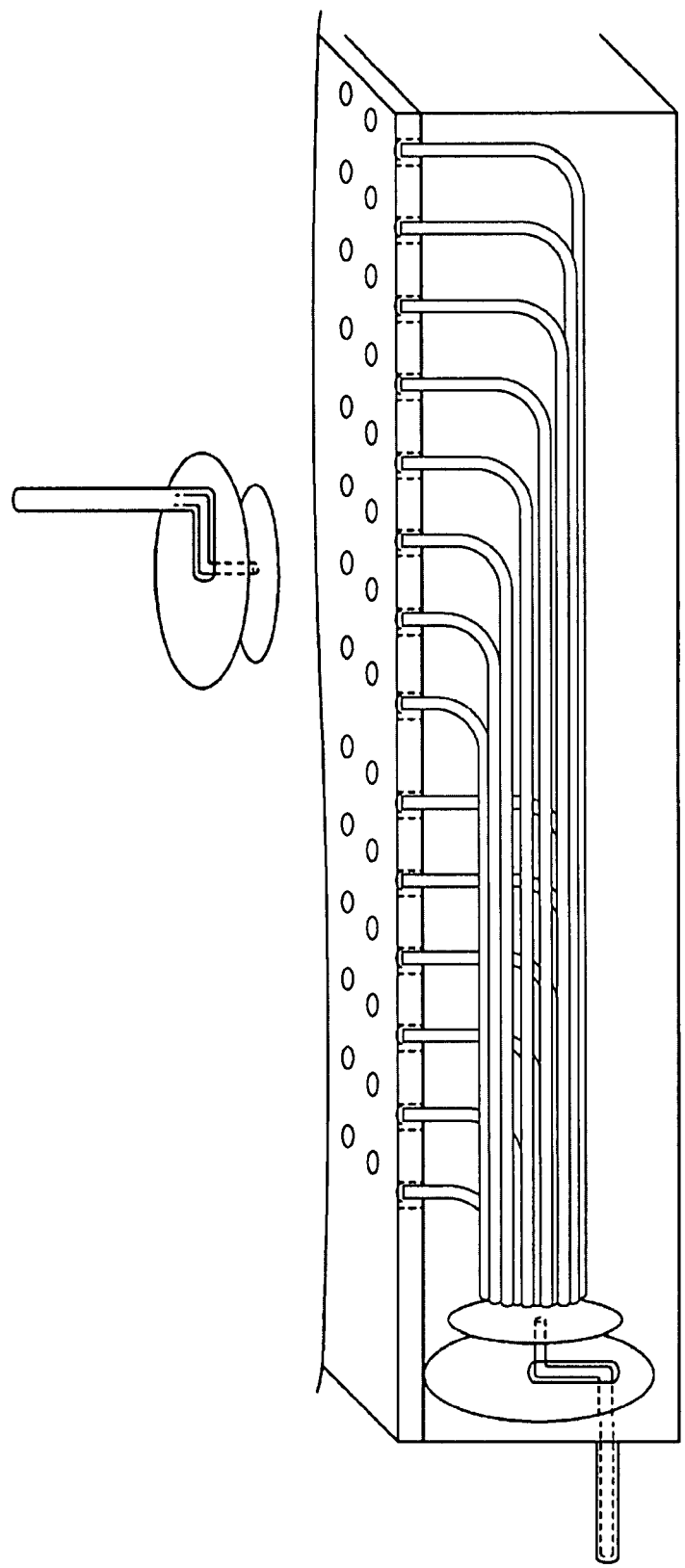
FIG. 6 is a diagram illustrating a configuration of a surface-wave transmission line proposed in the present invention.

Accordingly, the inventors propose the configuration of a surface-wave transmission line as shown in FIG. 5. The surface-wave transmission line shown in the figure is constituted, for example by a plurality of wire rods made of a metal whose surface is insulated, and propagates the surface wave using the plurality of wire rods.

Figure 7:
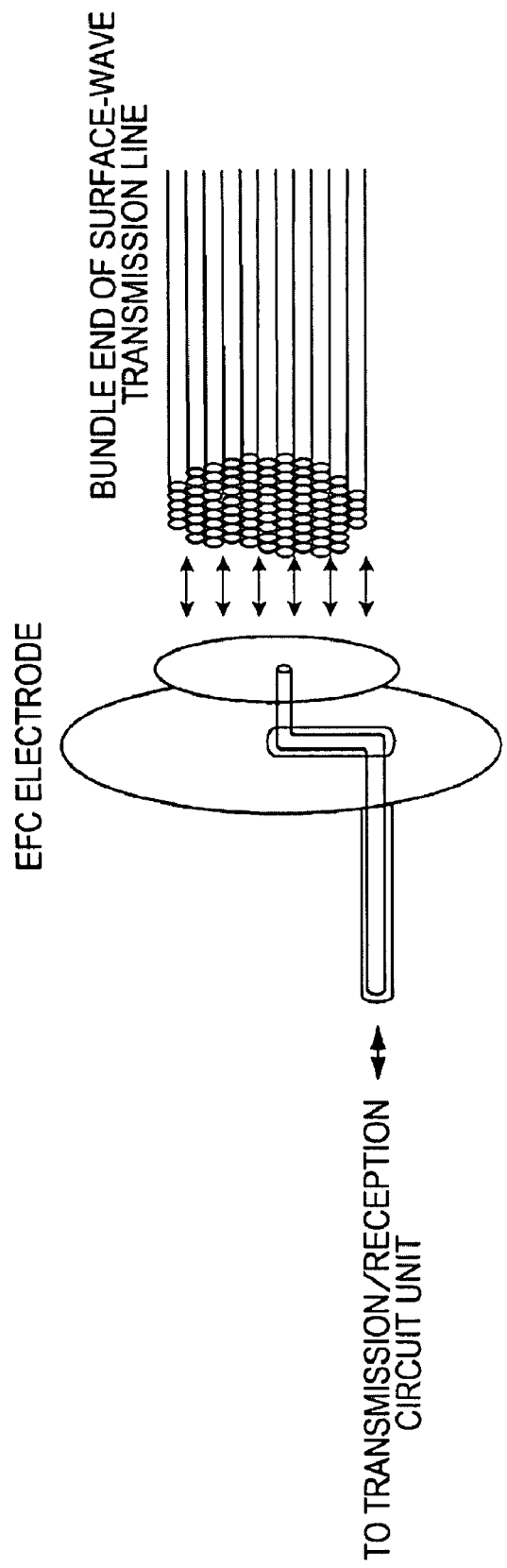
FIG. 7 is a diagram illustrating a configuration of a surface-wave transmission line proposed in the present invention.

The surface-wave transmission line shown in the figure is attached, for example to one of a pair of communication devices performing data transmission using electrostatic coupling. A bundle end bundling a plurality of wire rods is formed at one end of the surface-wave transmission line, and the end face thereof is attached to the EFC electrode at an appropriate position and angle. FIG. 7 illustrates a state of the vicinity of the bundle end bundling a plurality of wire rods. The EFC electrode of the communication device is substantially perpendicularly disposed on the end face of the bundle end bundling a plurality of wire rods with being spaced a few millimeters apart in order to obtain electrostatic coupling.

Figure 8:
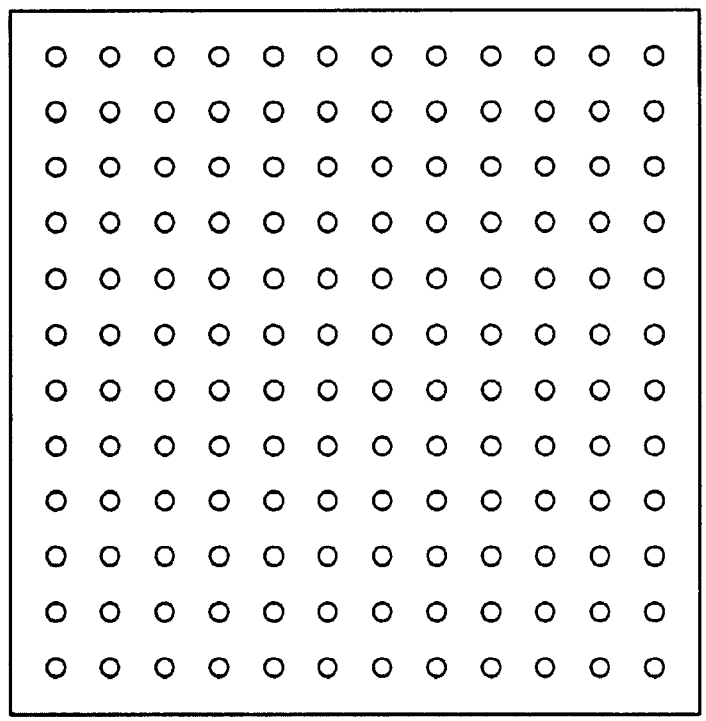
FIG. 8 is a diagram illustrating an example of an arrangement in which end faces of individual wire rods constituting a surface-wave transmission line are distributed on a flat coupling face.
Figure 9:
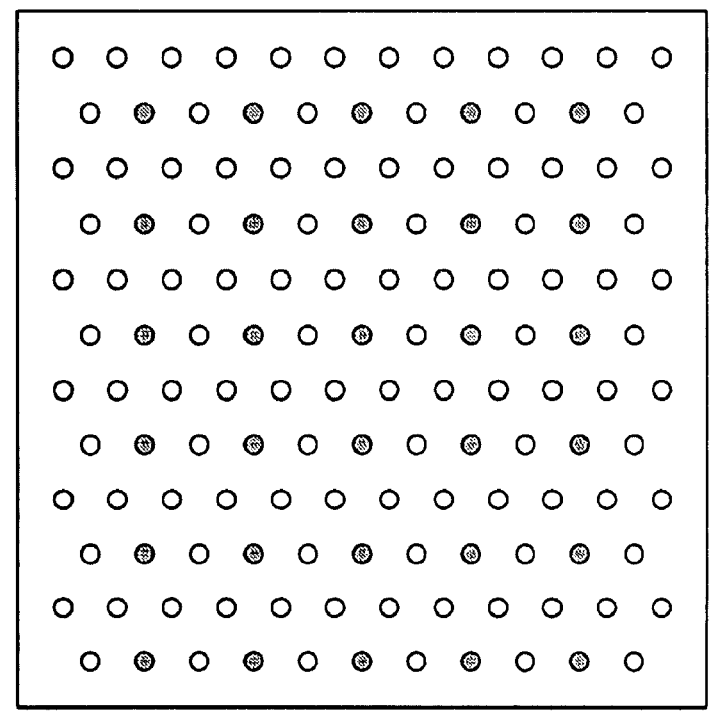
FIG. 9 is a diagram illustrating an example of an arrangement in which end faces of individual wire rods constituting a surface-wave transmission line are distributed on a flat coupling face.
Figure 10:
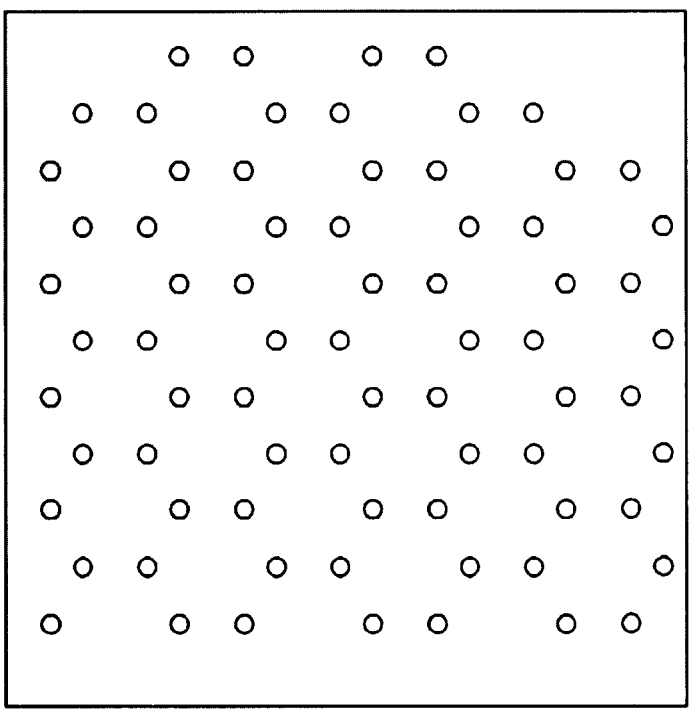
FIG. 10 is a diagram illustrating an example of an arrangement in which end faces of individual wire rods constituting a surface-wave transmission line are distributed on a flat coupling face.
Figure 11:
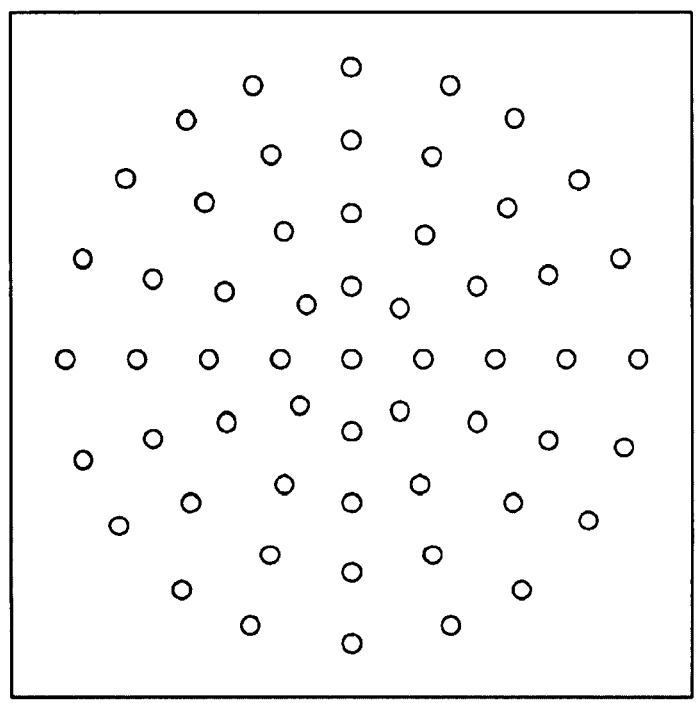
FIG. 11 is a diagram illustrating an example of an arrangement in which end faces of individual wire rods constituting a surface-wave transmission line are distributed on a flat coupling face.

Also, the bundle of a plurality of wire rods are undone at the other end of the surface-wave transmission line, and the end face of each wire rod is distributedly disposed as shown in FIG. 8, for example. Accordingly, when the user brings the coupling face of the communication device to be the communication partner close to any part of the coupling face in a distance of about a few millimeters or a few centimeters, an electrostatic coupling effect arises between the EFC electrodes of both communication devices through a part of wire rods whose end face is opposed to the coupling electrode. Thus, it becomes possible to perform data communication by surface-wave transmission.

When the surface-wave transmission line is made of specific (or a few number of) wire rods, it is necessary for the user to carry out difficult work, such as positioning the EFC electrode at a certain part of the device, and adjusting the angle facing to the apparatus to obtain the optimum communication state. In order to cope with this, as shown in FIG. 5, when an end face of each wire rod individually constituting a surface-wave transmission line is distributedly disposed on a flat coupling face, it is possible to realize electrostatic coupling using any part of the coupling face, and thus it becomes easy for the user to get an optimum communication state.

For example, the shape of a sheet can be applied to the flat coupling face. In such a case, the degree of freedom in the positioning of the EFC electrode to be placed close to the sheet increases. That is to say, even if an EFC-electrode embedded device is placed on any part of the sheet, it is possible to obtain a state allowing data transfer. Thus, the convenience of the user is improved.

FIGS. 8 to 11 illustrates examples of the disposition for distributing end faces of individual wire rods constituting a surface-wave transmission line on a flat coupling face. As shown in each figure, various ways can be considered as the disposition of the end faces of individual wire rods. The various ways can flexibly correspond to the implementation and the design of the product. Also, the end face of each wire rod can be disposed such that a user interface, such as a specific logo or an icon is drawn.

Also, in a surface-wave transmission line made of a plurality of wire rods, a specific relationship or rule may be established between an arrangement of end faces of individual wire rods at the bundle end formed by bundling a plurality of the wire rods and an arrangement of end faces of individual wire rods distributed on the flat coupling face.

Figure 12:
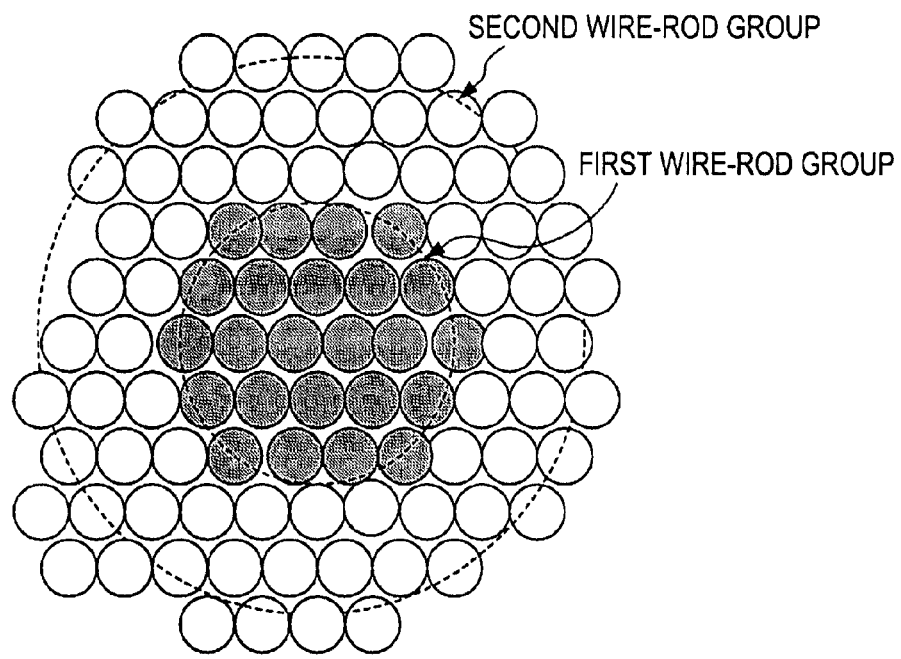
FIG. 12 is a diagram illustrating a state in which a first wire-rod group is formed to be disposed substantially in the center, and a second wire-rod group is formed to surround the first wire-rod group in the periphery at an end face of a bundle end bundling wire rods.

For example, as shown in FIG. 12, on an end face of the bundle end bundling wire rods, a first wire-rod group is formed to be disposed substantially in the center, and a second wire-rod group is formed to surround the first wire-rod group in the periphery. On the other hand, on the flat coupling face, the first wire-rod group and the second wire-rod group have substantially uniform densities at each part.

Figure 13:
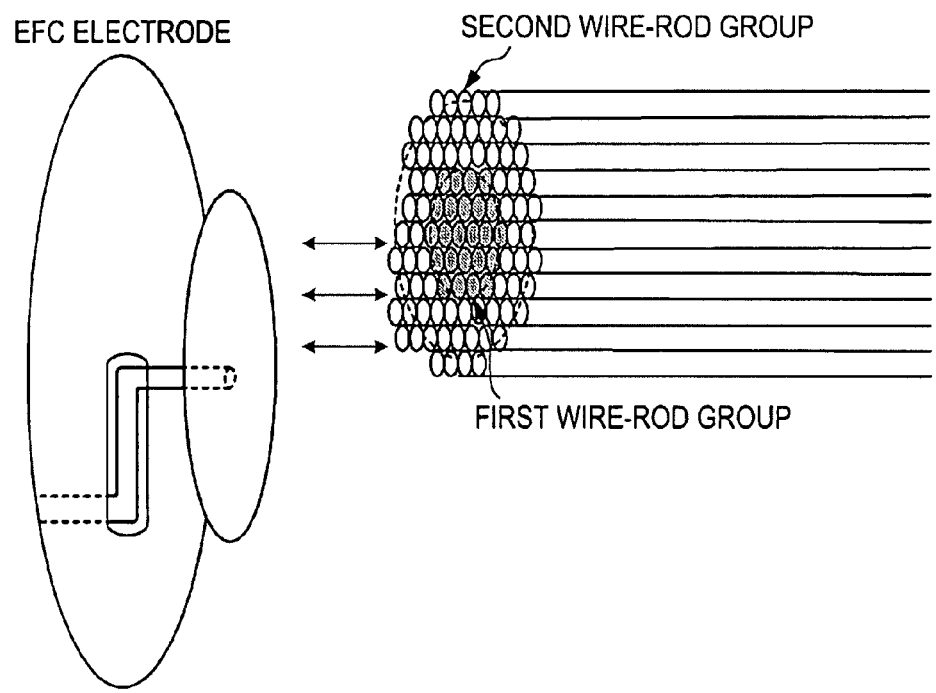
FIG. 13 is a diagram illustrating a state in which a bundle end and a coupling electrode are positioned in a shifted relationship.

At the end face of the bundle end bundling the wire rods, an RF is efficiently captured mainly by the first wire-rod group and the opposed EFC electrode thereto. As shown in FIG. 13, even if the positional relationship between the bundle end and the EFC electrode is shifted, it is easy to maintain a good positional relationship between the end face of the first wire-rod group, which is substantially at the center of the bundle end, and the EFC electrode. At the same time, on the flat coupling face, as shown by the shaded portion in FIG. 9, the first wire-rod group is disposed substantially uniformly distributedly to have uniform densities at any part. Thus, even if the EFC electrode of the communication device to be a communication partner is brought close to any place, it is possible to ensure uniform communication quality without depending on the place by receiving the electrostatic magnetic filed propagated through the wire rods included in the first wire-rod group. In other words, the transmission power is consumed mainly in the first wire-rod group regardless of the contact place of the EFC electrode of the communication device to be the communication partner.

Figure 14:
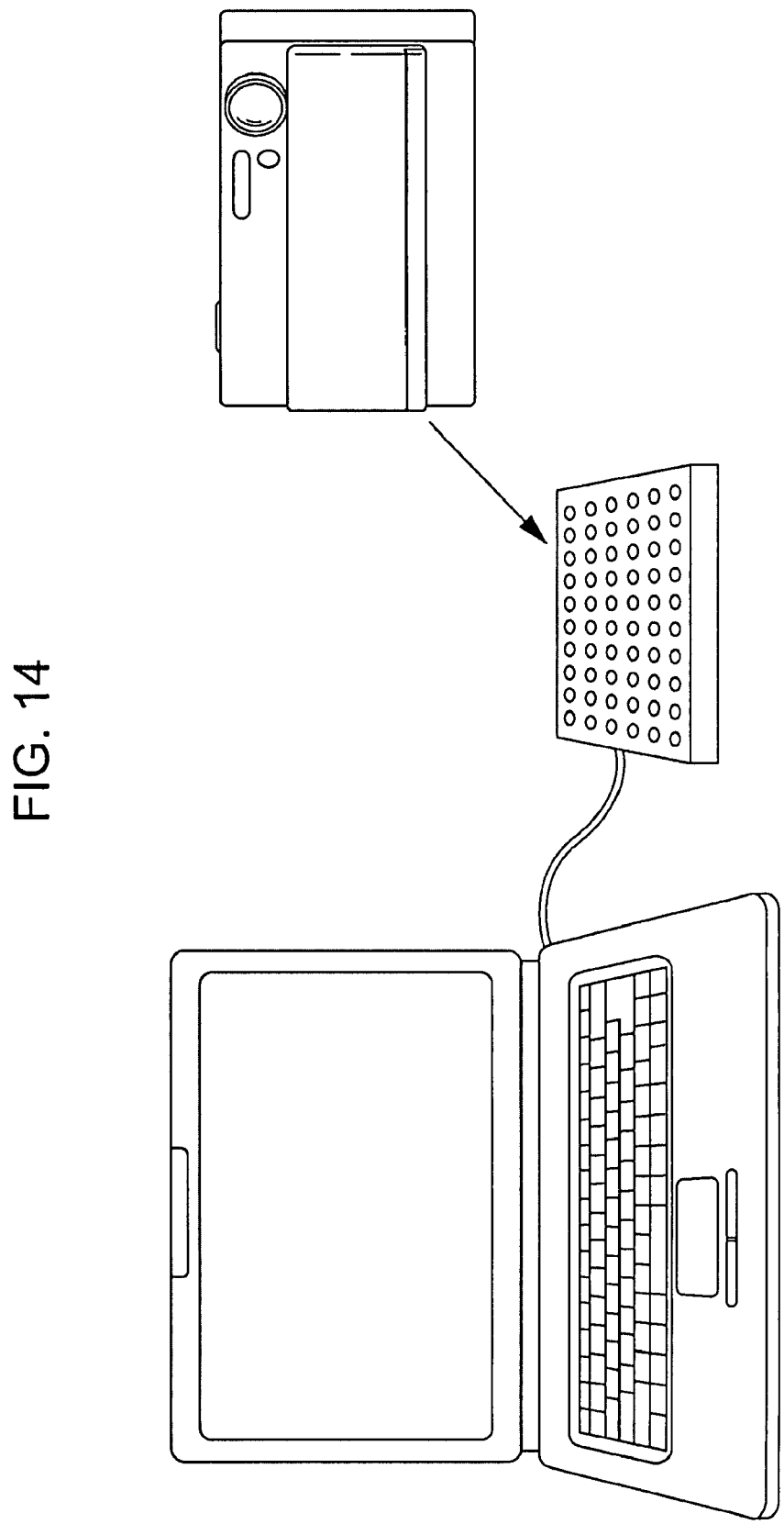
FIG. 14 is a view illustrating a specific example of a configuration of a communication system using a surface-wave transmission line.
Figure 15:
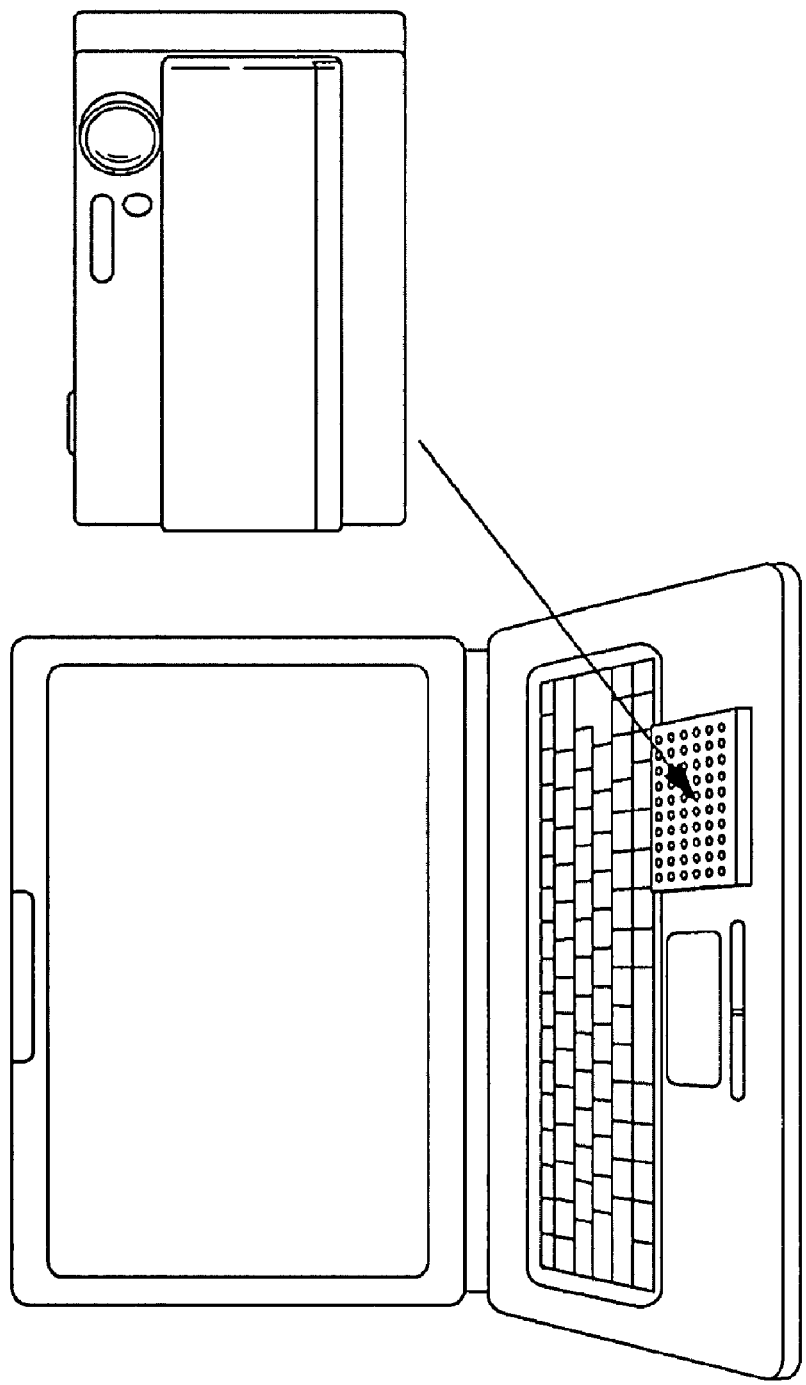
FIG. 15 is a view illustrating a specific example of a configuration of a communication system using a surface-wave transmission line.
Figure 16:
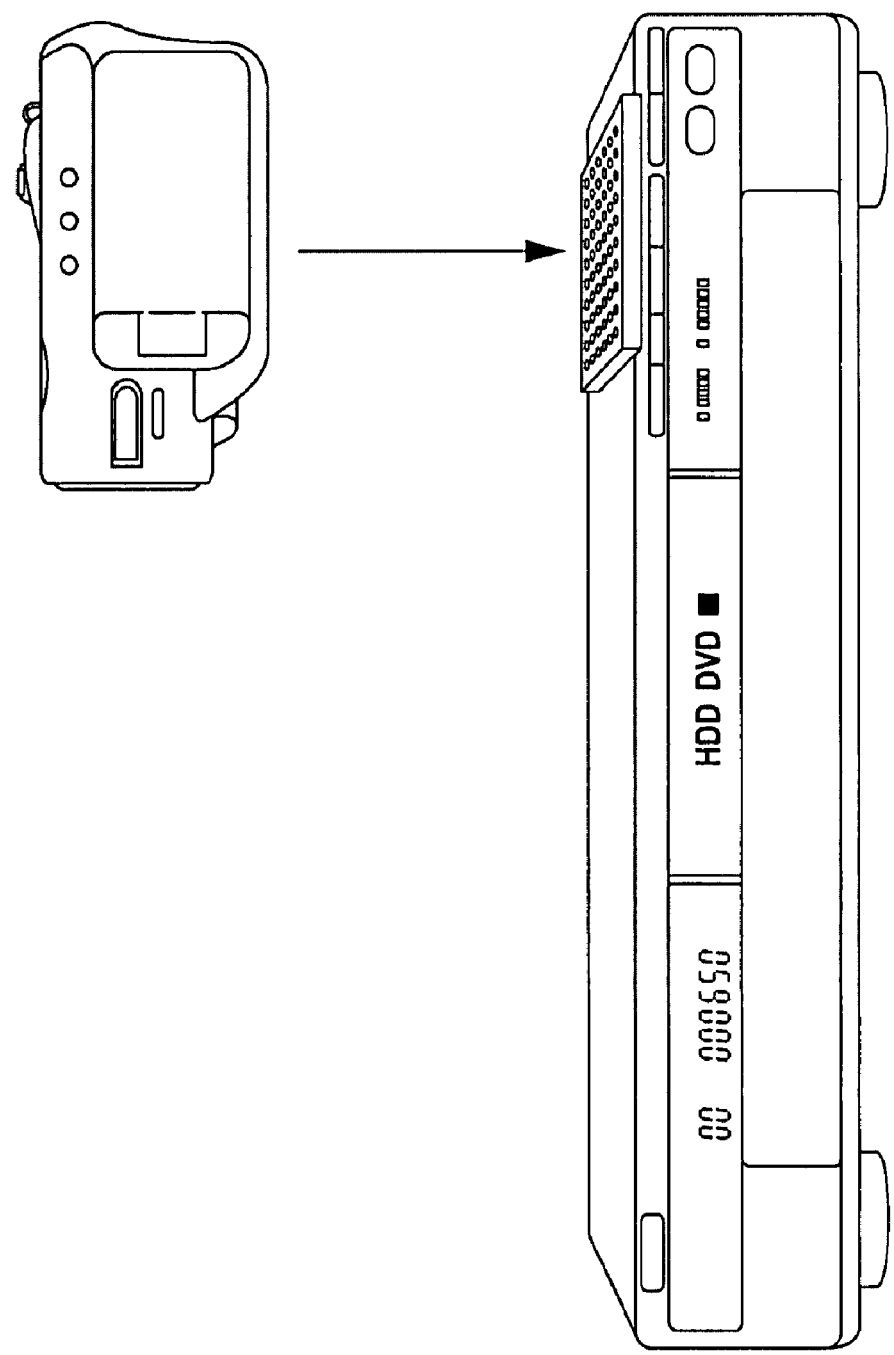
FIG. 16 is a view illustrating a specific example of a configuration of a communication system using a surface-wave transmission line.

In a basic usage of the surface-wave transmission line proposed in the present embodiment, the surface-wave transmission line is attached to one of the communication devices, and the end face thereof is fixed to the EFC electrode at an appropriate position and angle in order to obtain a good communication state at the bundle end bundling a plurality of wire rods. FIGS. 14 to 16 illustrate examples of specific configuration of communication systems using the surface-wave transmission line.

In the example shown in FIG. 14, a digital still camera, which transmits a captured image and a personal computer, which receives image data and performs image processing and image management, constitute a pair of communication devices, and each device has a built-in EFC electrode. Although not shown in the figure, the end face of the bundle end bundling a plurality of wire rods is fixed to the EFC electrode in the personal computer at an appropriate position and angle in order to obtain a good communication state. At the same time, as shown in the figure, a sheet-shaped coupling face on which the end face of each wire rod is distributedly disposed is disposed at the outside of the personal computer. When the user brings the EFC electrode of the digital still camera to be the communication partner close to any part of the coupling face in a distance of about a few millimeters or a few centimeters, an electrostatic coupling effect arises between the EFC electrodes of both communication devices through a part of wire rods whose end face is opposed to the coupling electrode. Thus, it becomes possible to perform data communication by surface-wave transmission.

Also, in the same manner as FIG. 14, FIG. 15 shows an example in which a digital still camera and a personal computer constitute a pair of communication devices. In the example shown in the figure, the entire surface-wave transmission line is built in the personal computer. The end face of the bundle end bundling a plurality of wire rods is fixed to the EFC electrode in the personal computer at an appropriate position and angle in order to obtain a good communication state (not shown in the figure). Also, as shown in the figure, a sheet-shaped coupling face on which the end face of each wire rod is distributedly disposed is placed in the vicinity of a palm rest in front of the keyboard of the personal computer. When the user brings the EFC electrode of the digital still camera to be the communication partner close to the coupling face on the palm rest in a distance of about a few millimeters or a few centimeters, an electrostatic coupling effect arises between the EFC electrodes of both communication devices through a part of wire rods whose end face is opposed to the coupling electrode. Thus, it becomes possible to perform data communication by surface-wave transmission.

Also, FIG. 16 shows an example in which a digital video camera capturing a moving image and a DVD recorder recording a moving image data onto a large capacity medium, such as a DVD (Digital Versatile Disc), etc., constitute a pair of communication devices. In the example shown in the figure, the entire surface-wave transmission line is built in the DVD recorder (not shown in the figure). The end face of the bundle end bundling a plurality of wire rods is fixed to the EFC electrode in the DVD recorder at an appropriate position and angle in order to obtain a good communication state. Also, a sheet-shaped coupling face, on which the end face of each wire rod is disposed, is placed on the top face of the DVD recorder. When the user brings the EFC electrode of the digital still camera to be the communication partner close to the coupling face placed on the top face of the DVD recorder in a distance of about a few millimeters or a few centimeters, an electrostatic coupling effect arises between the EFC electrodes of both communication devices through a part of wire rods whose end face is opposed to the coupling electrode. Thus, it becomes possible to perform data communication by surface-wave transmission.

The surface-wave propagation device proposed in the present embodiment includes a plurality of wire rods made of metal whose surface is insulated. The surface-wave propagation device has a bundle end formed by bundling the plurality of wire rods at one end, the bundle of the wire rods are undone at the other end of the surface-wave transmission lines, and an end face of each of the wire rods is distributedly disposed on a flat coupling face. As described above, as shown in FIG. 17A, such a surface-wave transmission line is used such that the end face of the bundle end is attached to the EFC electrode at an appropriate position and angle in order to obtain a good communication state.

Figure 17A:
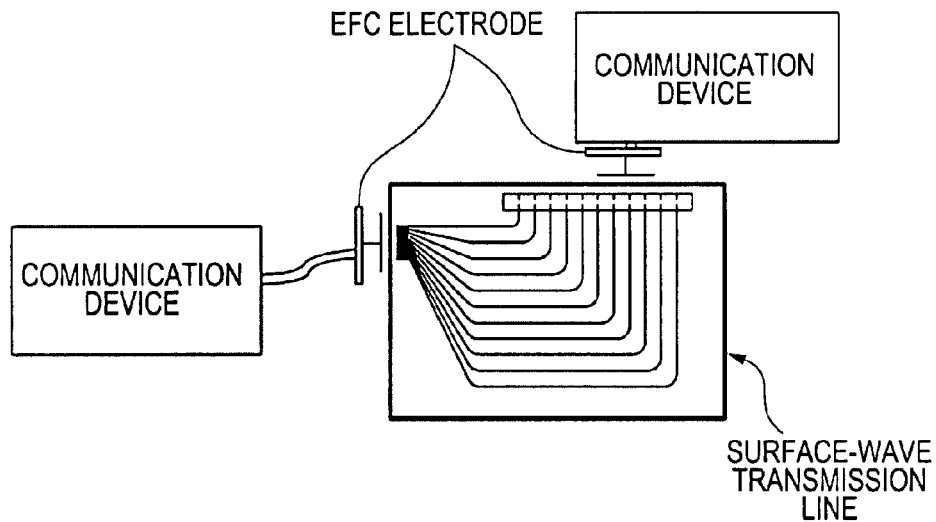
FIG. 17A is a diagram illustrating a basic type of usage of a surface-wave transmission line.
Figure 17B:
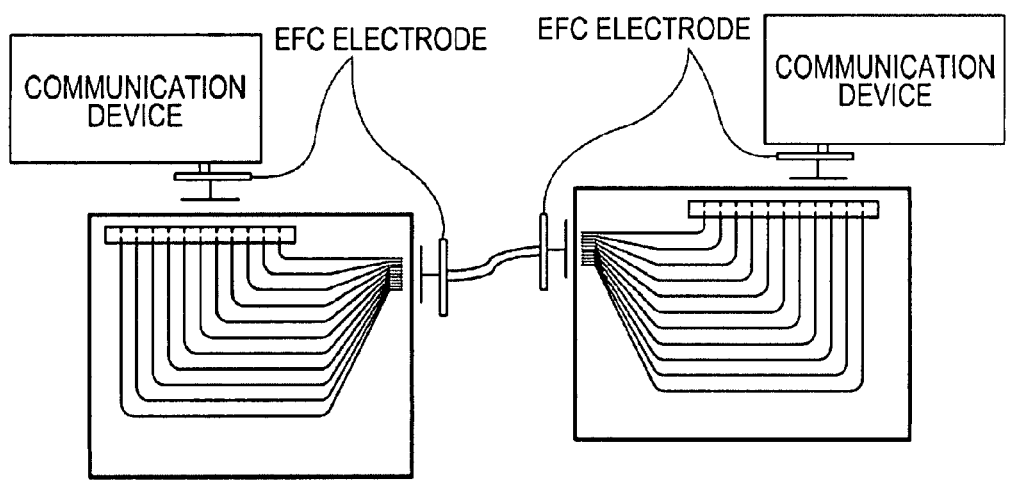
FIG. 17B is a diagram illustrating another type of usage of a surface-wave transmission line.

FIG. 17B shows another example of the use of such a surface-wave transmission line. In the example shown in the figure, a pair of surface-wave transmission lines having the same configuration are connected at the bundle end bundling a plurality of wire rods through a connecting line having an EFC electrode on each end. By bringing communication devices in close contact with the coupling faces of individual surface-wave transmission lines, it is possible to perform data transmission.

In the basic form of the surface-wave propagation device proposed in the present embodiment, as shown in FIG. 17A, a bundle end is formed by bundling a plurality of wire rods at one end, whereas the bundle of the wire rods are undone at the other end of the linear surface-wave transmission lines, and an end face of each of the wire rods is distributedly disposed on the flat coupling face.

Figure 18:
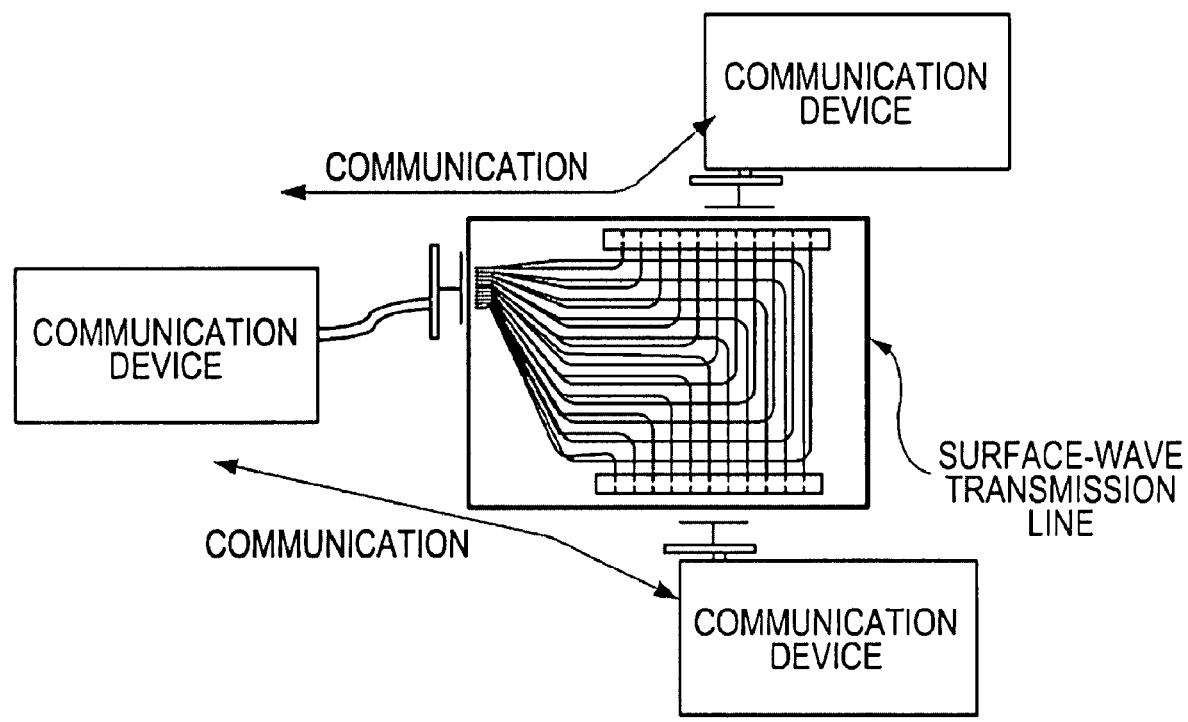
FIG. 18 is a diagram illustrating a modification of a surface-wave transmission line made of a plurality of wire rods.

FIG. 18 illustrates a modification of the surface-wave transmission line made of a plurality of wire rods. In the example shown in the figure, a bundle end is formed by bundling a plurality of wire rods at one end, whereas the bundle of the wire rods are undone to be divided into two, up and down individually, and an end face of the wire rods is distributedly disposed on the flat coupling face on the top face and under face individually. In such a case, the user brings the EFC electrode of the communication device close to the coupling face of either the top face or the under face, and thus it becomes possible to perform data communication with the communication device whose EFC electrode is disposed on the bundle end.

Figure 19:
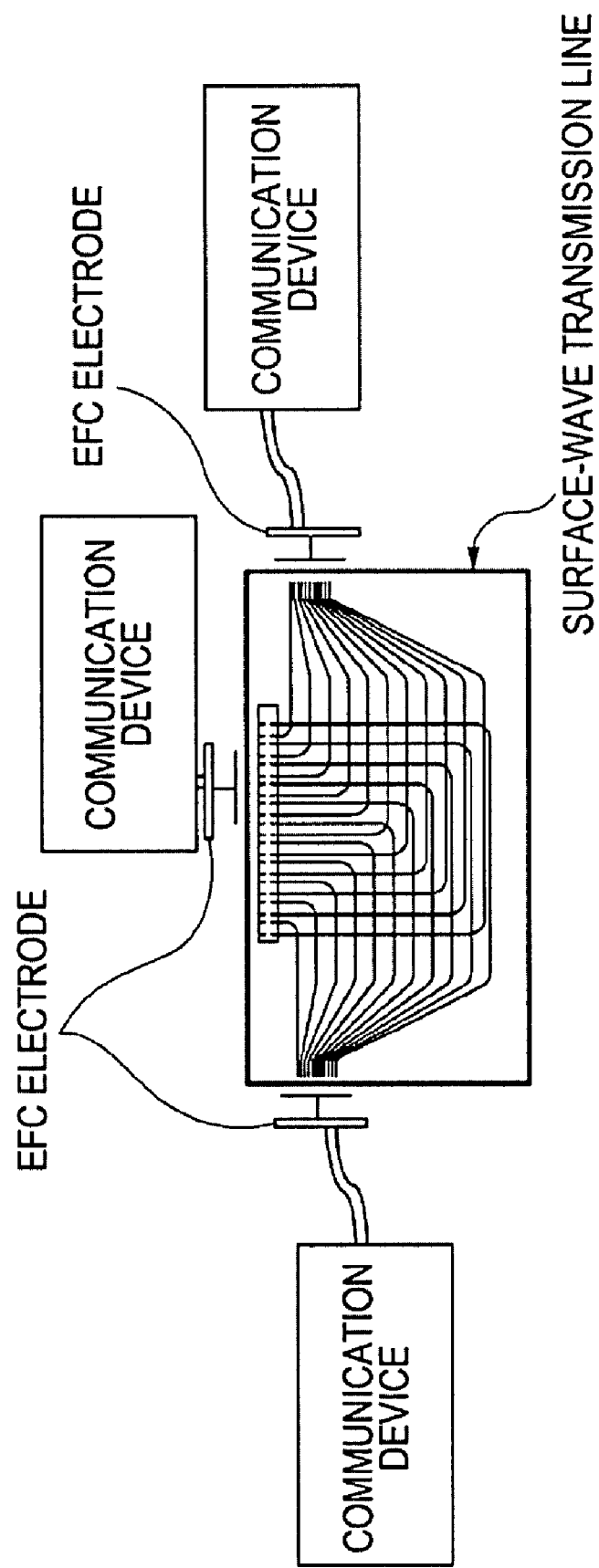
FIG. 19 is a diagram illustrating another modification of a surface-wave transmission line made of a plurality of wire rods.

Also, FIG. 19 illustrates another modification of the surface-wave transmission line made of a plurality of wire rods. In the example shown in the figure, two bundle ends bundling a plurality of wire rods are provided, and the end faces of these wire rods are distributedly disposed on one coupling face uniformly. In such a case, the user brings the EFC electrode of the communication device close to either of the coupling faces, and thus it becomes possible to perform data communication with the communication device whose EFC electrode is disposed on the bundle end.

The surface-wave propagation device proposed in the present embodiment includes a plurality of wire rods made of metal whose surface is insulated. However, as described above, the surface wave can propagate through, for example inside and the surface of a dielectric or a magnetic body, and thus it is possible to constitute a surface-wave transmission line using a linear dielectric or a magnetic body. The propagation mode of a surface wave in a dielectric or a magnetic body includes roughly two modes unlike the case of a conductor. One of the modes is a mode in which a surface wave propagates on the surface of a medium, and this is the same mode that occurs in the case of a metal. The other of the modes is a mode in which a surface wave internally propagates in a dielectric, etc. This internal propagation mode includes a propagation mode in which a surface wave is totally reflected on the border of two media having different permittivities (permeability in the case of a magnetic body). Specifically, when a surface wave enters into a dielectric having a permittivity $\in$ greater than a permittivity $\in_0$ of the surrounding environment, the surface wave proceeds in parallel with the border face, and total reflection occurs on the border face of the two media having different permittivities. When a linear surface-wave transmission line is constituted with a dielectric or a magnetic body using this quality, it is desirable to reduce a propagation loss using a method in which a material having a high permittivity is used as a surface-wave transmission line, and the periphery thereof is coated with a material having a lower permittivity than that of the transmission line, etc.

The present invention has been explained in detail by referring to the specific embodiments. However, it is obvious that those skilled in the art can perform modifications and substitutions on the embodiments without departing from the spirit of the present invention.

In this specification, a description has been mainly given of the embodiments in which the present invention is applied to a communication system that transmits a UWB signal by electrostatic coupling in a cableless manner. However, the gist of the present invention is not limited to this. For example, it is also possible to apply the present invention to a communication system that uses an RF signal other than the UWB communication scheme and a communication system that performs data transmission by electrostatic coupling using a relatively low frequency signal.

In short, the present invention has been disclosed in a form of an example. The description of this specification should not be limitedly interpreted. In order to determine the gist of the present invention, the appended claims should be taken into account.

What is claimed is:

1. A surface-wave propagation device comprising a plurality of linear surface-wave transmission lines propagating a surface wave that is a longitudinal wave component of an electromagnetic wave radiated by electrostatic coupling from an electrical-field coupling electrode disposed in a communication apparatus, wherein a bundle end of the linear surface-wave transmission lines closed to an electrical-field coupling electrode is formed by bundling a plurality of wire rods at one end, and the bundle of the wire rods are undone at the other end of the linear surface-wave transmission lines closed to an electrical-field coupling electrode.

2. The surface-wave propagation device according to claim 1, wherein each of the surface-wave transmission lines includes a metal whose surface is insulated.

3. The surface-wave propagation device according to claim 2, wherein a specific relationship or rule is established between an arrangement of end faces of individual wire rods at the bundle end formed by bundling a plurality of the wire rods made of a metal whose surface is insulated and an arrangement of end faces of individual wire rods distributed on the flat coupling face.

4. The surface-wave propagation device according to claim 3, wherein on an end face of the bundle end bundling wire rods, a first wire-rod group is formed to be disposed substantially in the center, and a second wire-rod group is formed to surround the first wire-rod group in the periphery, and on the flat coupling face, the first wire-rod group and the second wire-rod group are disposed to have substantially uniform densities at each part.

5. The surface-wave propagation device according to claim 1, wherein an end face of each of the wire rods is distributedly disposed on a flat coupling face at the other end.

* * * * *